United States Patent [19]
Bergmans et al.

[11] Patent Number: 6,134,065
[45] Date of Patent: *Oct. 17, 2000

[54] METHOD AND DEVICE UTILIZING ERASURE INFORMATION AS A RELIABILITY INDICATOR IN AN INFORMATION MEDIUM

[75] Inventors: Johannes W. M. Bergmans; Johannes O. Voorman, both of Eindhoven, Netherlands; Steve Brittenham, Boise, Id.

[73] Assignees: U.S. Philips Corporation; Hewlett-Packard Company, both of New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/709,500

[22] Filed: Sep. 6, 1996

[51] Int. Cl.$^7$ ...................................................... G11B 5/09

[52] U.S. Cl. ............................................................. 360/53

[58] Field of Search ................................. 360/13, 22, 32, 360/53, 60, 27, 31, 51, 15; 370/324; 386/116; 371/38; 711/112

[56] References Cited

U.S. PATENT DOCUMENTS

| | | | |
|---|---|---|---|
| 4,549,295 | 10/1985 | Purvis | 360/53 |
| 4,575,770 | 3/1986 | Dieterich | 386/116 |
| 4,791,643 | 12/1988 | Molstad et al. | 371/47.1 |
| 4,924,331 | 5/1990 | Robinson et al. | 360/49 |
| 5,121,263 | 6/1992 | Kerwin et al. | 360/53 |
| 5,589,994 | 12/1996 | Yamasaki et al. | 360/15 |
| 5,892,884 | 4/1999 | Sugiyama et al. | 360/32 |

OTHER PUBLICATIONS

"Comparative Performance Between Drop–Out Detection and Viterbi Reliablility Metric Erasure Flagging" W. Ryan, IEEE Transactions on Magnetics, vol. 28, No. 5, Sep. 1992, pp. 2898–2900.

Performance Improvement in Decision Feedback Equalisers by Using 'Soft Decision', E. Dahlman et al, Electronics Letters, vol. 24, No. 17, Aug. 18, 1988, pp. 1084–1085.

"A Null Zone Decision Feedback Equalizer Incorporating Maximum Likelihood Bit Detection" R. Gitlin et al, IEEE Transactions on Communications, vol. Com–23, No. 11, Nov. 1975 pp. 1243–1250.

"On Decoding of Correlative Level Coding Systems with Ambiguity Zone Detection" H. Kobayashi et al, IEEE Transactions on Communication Tech., vol. Com. –19, No. 4, Aug. 1971, pp. 467–477.

"A Window–Margin–Like Procedure for Evaluating PRML Channel Performance" T. Perkins et al, IEEE Transactions on Magnetics, vol. 31, No. 2, Mar. 1995, pp. 1109–1114.

"Magnetic Charcterization Using Elements of a PRML Channel" J. Coker et al, IEEE Transactions on Magnetics, vol. 27, No. 6, Nov. 1991, pp. 4544–4548.

"Digital Communications" J. Proakis, McGraw–Hill, 1983, p. 61.

"Theory and Practice of Error Control Codes" R. Blahut, Addison–Wesley Publishing, p. 11 and p. 199.

"A Method of Analysis for Interleaved Reed–Solomon Coding with Erasure Decoding on Burst Error Channels" W. Ryan et al, IEEE Transactions on Communications, vol. 41, No. 3, Mar. 1993, pp. 430–434.

*Primary Examiner*—Paul Loomis
*Assistant Examiner*—Regina Y. Neal
*Attorney, Agent, or Firm*—Bernard Franzblau

[57] ABSTRACT

A method and a device in which information is written on a medium and is read out, and which establishes whether the information read is sufficiently reliable, and in which so-called erasure information is used to establish the influence of media defects and other imperfections on the occurrence of errors in a transmission system. The medium is, for example, a hard disk containing one or more bad spots whose location can be accurately detected. The implementation of the method makes accurate and fast computation of the bit error rate possible.

20 Claims, 2 Drawing Sheets

METHOD AND DEVICE UTILIZING ERASURE INFORMATION AS A RELIABILITY INDICATOR IN AN INFORMATION MEDIUM

FIELD OF THE INVENTION

The present invention relates to a method according to which information is written on a medium and read out, while there is established whether the information read is sufficiently reliable.

The present invention likewise relates to a device which comprises read/write means with reliability indicator means, which read/write means are coupled to a medium.

The above medium may be, for example, a readable and writable or not medium, such as a Compact Disc, or a disk, more particularly a hard disk, but may also be considered a transmission medium in a radio transmission system, in which case the medium is the air or atmosphere, and may have not only location-dependent, but also time-dependent properties which affect the recording or reading behavior of the medium. For simplicity of the present description, a hard disk is generally selected as the medium in the following.

BACKGROUND OF THE INVENTION

It is generally known to subject hard disks to a test prior to marketing them, during which test a test pattern is recorded on the medium which is then read out, after which the pattern read is compared with the original test pattern. The comparison yields information about the locations in the medium where media defects occur and also about the bit error rate. A media defect is present when information read from a particular location on the medium always results in an error. In contrast, normal read errors occur randomly and are not dependent on the location on the medium from which the information is read.

This known method, for which usually the address is to be administered for each bit location and checks are to be made whether the respective bit location has been correctly written and read out, lays a large claim on hardware and software and, moreover, requires much time especially where measuring the bit error rate is concerned. Such a laborious test is not attractive, particularly for the media customary nowadays which have large storage capacities, and for the fast delivery required by the customers and the large demand for hard disks.

SUMMARY OF THE INVENTION

It is an object of the present invention to provide a method and a device for implementing the method in a transmission system or provide an information processing system in which the possibilities for applying erasure information are enhanced, without requiring substantially more hardware.

For this purpose, the method according to the invention is characterized in that erasure information is used as a reliability indicator to establish the influence of media defects or other imperfections on the occurrence of defects.

In consequence, the device according to the invention is characterized in that the reliability indicator means comprise an erasure information generator means for providing a measure to establish the influence of media defects and other imperfections on the occurrence of errors.

The advantage of the method according to the invention is that the field of application for erasure information is enlarged, because this information now also appears to be practicably suitable not only for effectively correcting contingent bit errors as will be described hereafter, but also for establishing the influence of media defects and other imperfections which form a systematic or not cause of errors in an information processing system (with regard to both quality and quantity). The occurrence of erasures is then seen as, for example, a starting point of a bad spot on the hard disk caused by a medium defect, or the average frequency at which erasures occur is indicative of the bit error rate. The imperfections referred to are, for example: noise, that is to say, media noise, quantization noise, electronics noise, or equalization errors, signal distortion, cross talk between adjacent tracks, and so on.

The notion of erasure knows a number of definitions in the literature. Reference is made, for example, to Richard E. Blahut, "Theory and Practice of Error Control Codes", Addison-Wesley, Reading, Mass., 1983 (p. 11, p. 199); John G. Proakis, "Digital Communications", McGraw-Hill, New York, 1983, (p. 61); and the article entitled "A Method of Analysis for Interleaved Reed-Solomon Coding with Erasure Decoding on Burst Error Channels" by William E. Ryan and Paul Conoval (IEEE Trans. Commun., Vol. 41, No. 3, pages 430–434, March 1993). Erasures are generally indicative of unreliable decisions. For example, a bit detector may use an additional symbol value which indicates that no reliable decision with respect to the respective data symbol is possible. For binary data symbols in the alphabet {0,1} this means that the bit detector has a ternary output signal having "0", "1" and erasure as possible symbols. As discussed in said article by Ryan and Conoval (cf. FIG. 1b and associated text), it is likewise possible that the bit detector has an additional output which indicates whether a decision made is unreliable or not. In the case of binary data symbols, this means that the detector has a binary output for bit decisions made and a second binary output for erasure symbols. True enough, in the following description such a detector is started from, but the applicability of the invention to be explained below is not restricted to this, because this invention also comprises the applicabilities of said detectors which have a combined data/erasure output.

It is also known that receivers in a transmission system include an erasure detection mechanism. Examples thereof are found in the literature in:

H. Kobayashi, "On Decoding of Correlative Level Coding Systems with Ambiguity Zone Detection", IEEE Trans. Commun. Technol., Vol. COM-19, No. 4, pp. 467–477, August 1971. The term ambiguity zone detection is used here instead of erasure detection;

R. D. Gitlin and E. Y. Ho, "A Null-Zone Decision Feedback Equalizer Incorporating Maximum Likelihood Bit Detection", IEEE Trans. Commun., Vol. COM-23, No. 11, pp. 1243–1250, November 1975. The term null-zone detection is used here instead of erasure detection;

E. Dahlman and B. Gudmundson, "Performance Improvement in Decision Feedback Equalisers by Using 'Soft Decision'", Electronics Letters, Vol. 24, No. 17, pp. 1084 et seq., August 1988. The term soft decision is used here instead of erasure;

W. E. Ryan, "Comparative Performance Between Drop-Out Detection and Viterbi Reliability Metric Erasure Flagging", IEEE Trans. Magn., Vol. 28, No. 5, pp 2898–2900, September 1992. Use is made here of one-byte-wide erasure flags, while an erasure flag is determined for each detected byte instead of for each detected bit; and J. W. M. Bergmans and J. O. Voorman, "Dual Decision Feedback Equalizer", European application no. 96201849.5.

Occasionally, the erasure information is used to have the bit errors corrected more efficiently than would be possible without erasures by applying an error correcting code. However, erasure information is not utilized for a reliability analysis to establish the influence of media defects and other imperfections on the occurrence of errors.

In an embodiment of the method according to the invention, the erasure information is processed and in particular embodiments, a measure for that erasure information is even taken outside the IC, as required, to be further processed in a transmission system. In a particular embodiment, the erasure information is counted.

Besides the fact that counting can simply be implemented in, for example, a chip, those media intended for substantially reliable information transmission or information storage show hardly any erasures. Therefore, the counting of erasures, which then scarcely occur, occupies not more than a small part of the total activities and side activities which accompany the recording and reading of information on such media.

A further embodiment of the method according to the invention is characterized in that the erasure information is counted during relatively short periods of time, which short erasure counting provides a measure to detect the location of media defects in the medium and/or in that the erasure information is counted during relatively long periods of time, which long erasure counting provides a measure for the bit error rate of information transmission by the medium.

If bursts of erasures turn out to occur during relatively short erasure measuring periods, if it were recurring with a certain regularity, the respective track on the medium is assumed to have bad/defective spots. Or, if erasures regularly occur at corresponding spots in neighbouring tracks of the disk, bad spots are supposed to show up there.

When erasures are measured during longer measuring periods, the erasures can be counted in, for example, a simple counter to be incorporated in the IC itself, as required. Such a counter can then take a relatively long time to produce its count, because this count is not correlated with a spot on the medium where (erroneous) reading takes place at that moment. It is always possible to find an opportunity for producing the count at a suitable moment at relatively long intervals via external pins already realized on the IC, for example, by a serial interface already available, when there are no writing and/or reading activities on the hard disk at a specific moment. This count can be used as a measure of the bit error rate caused by media defects. Since the number of erasures is, for example, 1000 times larger than the number of bit errors, the counting of erasures is much less time consuming than was previously necessary for counting the number of bit errors for a direct computation of the bit error rate. Besides, the resulting estimate of the bit error rate is accurate, in principle, because statistical fluctuations are averaged by the long measuring period.

Yet a further embodiment of the method according to the invention is characterized in that, if the erasure information is counted during relatively short periods of time, the counting (incrementing) instants are stored relative to the spot on the medium where the reading takes place at that instant, to be able to trace or mark the spot where reading takes place at that instant as the spot of a medium defect.

In that case, it is also possible to keep track of these spots in a simple counter optionally to be incorporated in the IC so that that part of the medium can be marked as unusable or writing and/or reading activities.

In the practical situation where a usually digital recording medium such as a hard disk is used as a medium, the administering and storing of the bad spots in the tracks of a had disk does entail to take information outside the IC, which enhances the necessary number of external pins on the IC. In an embodiment to be explained below, the present invention also resolves that problem in a manner in which said advantages are maintained.

A still further embodiment of the method according to the invention is characterized in that a bit error is deliberately introduced into the read data stream when an erasure is detected during the reading of digital information from the medium.

The deliberate introduction of a bit error in a digital system of, for example, two levels implies the deliberate substitution of a "1" for a "0" and vice versa, whereas, for example, in a quaternary system, a "1", "2" or "3" is substituted for the "0" and vice versa. The bit error may, in principle, be introduced by a very fast but easy-to-use exclusive-OR circuit in the IC. The error introduced deliberately is detected and corrected by the error correcting means available downstream anyway, provided that not too many errors are introduced, and thus has no adverse effect on the eventual information content of the data stream read, whereas the location of the deliberate error unambiguously points at the medium defect. The marking of bad spots on the medium can therefore be effected highly accurately, so that an area marked as defective is not selected unnecessarily large, which would needlessly restrict the storage capacity of the medium.

The bit error is preferably introduced at the bit just preceding the erasure bit. The preceding bit was most probably correct, so that an error is introduced indeed and not an incorrect bit happens to be corrected instead of a correct bit deliberately being made erroneous.

In a very simple embodiment, a hard disk can be tested quickly by writing a regular pattern of, for example, only zeroes or ones. If a deviation from the original pattern is then detected when read, it is assumed that this points at the presence of a medium defect. In this test no use is thus made of an error correcting code.

BRIEF DESCRIPTION OF THE DRAWINGS

These and other aspects of the invention will be apparent from and elucidated with reference to the embodiments described hereafter.

In the drawings:

Figure 1:
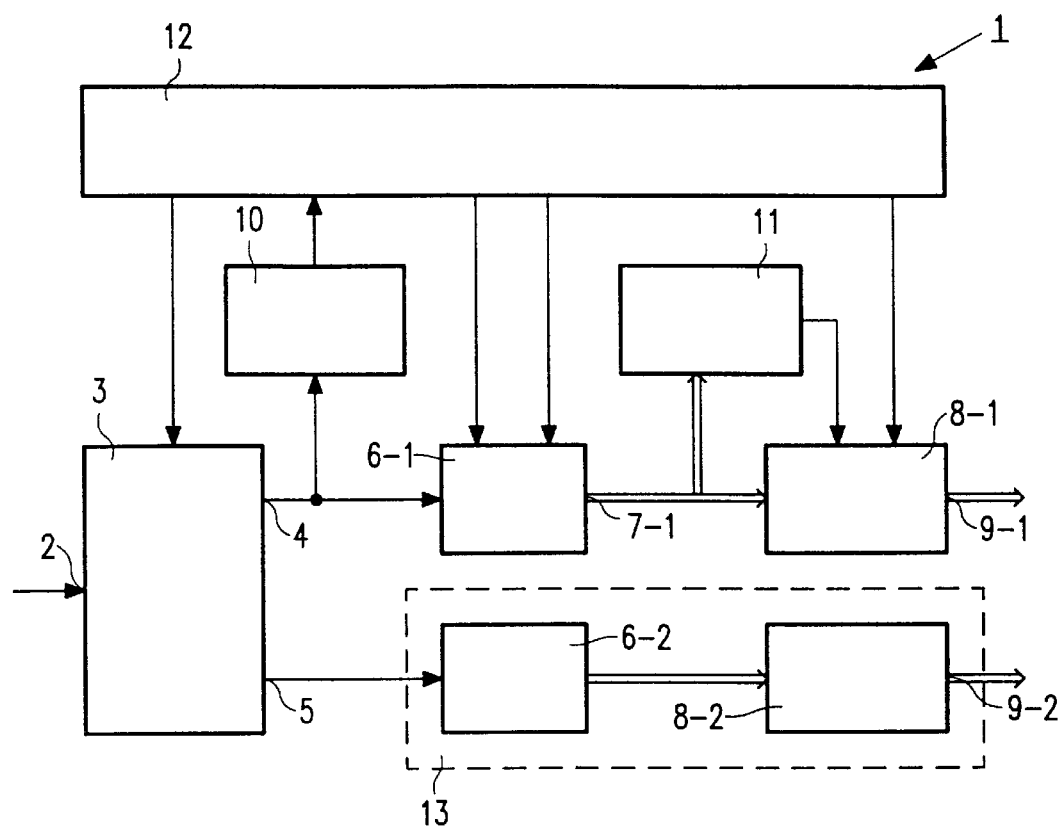
Figure 2:
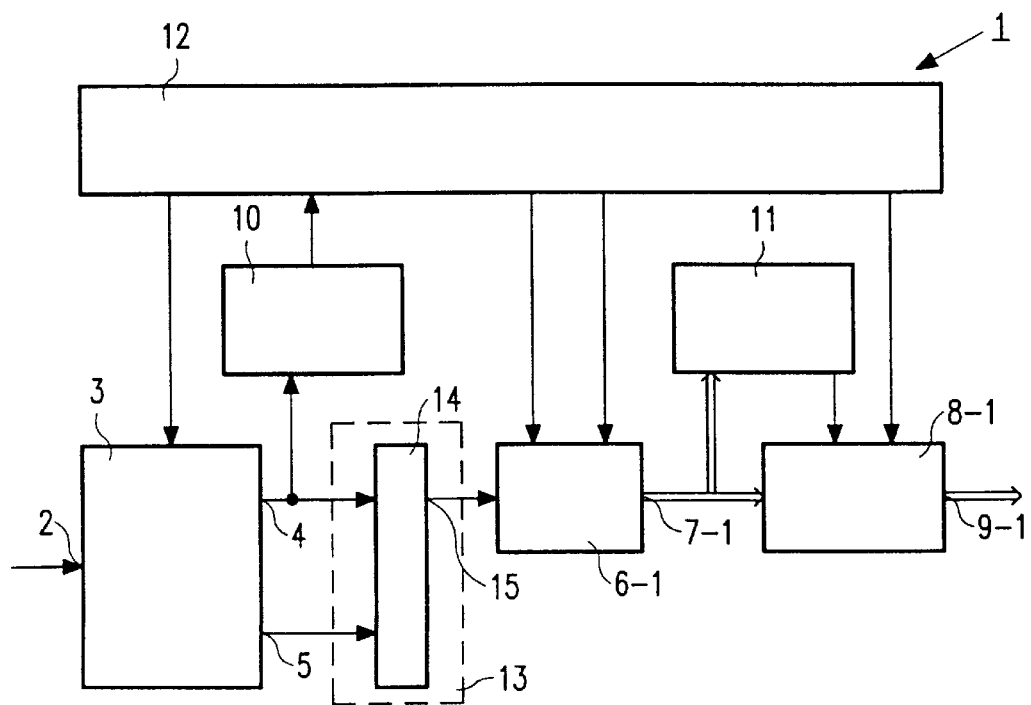
Figure 3:
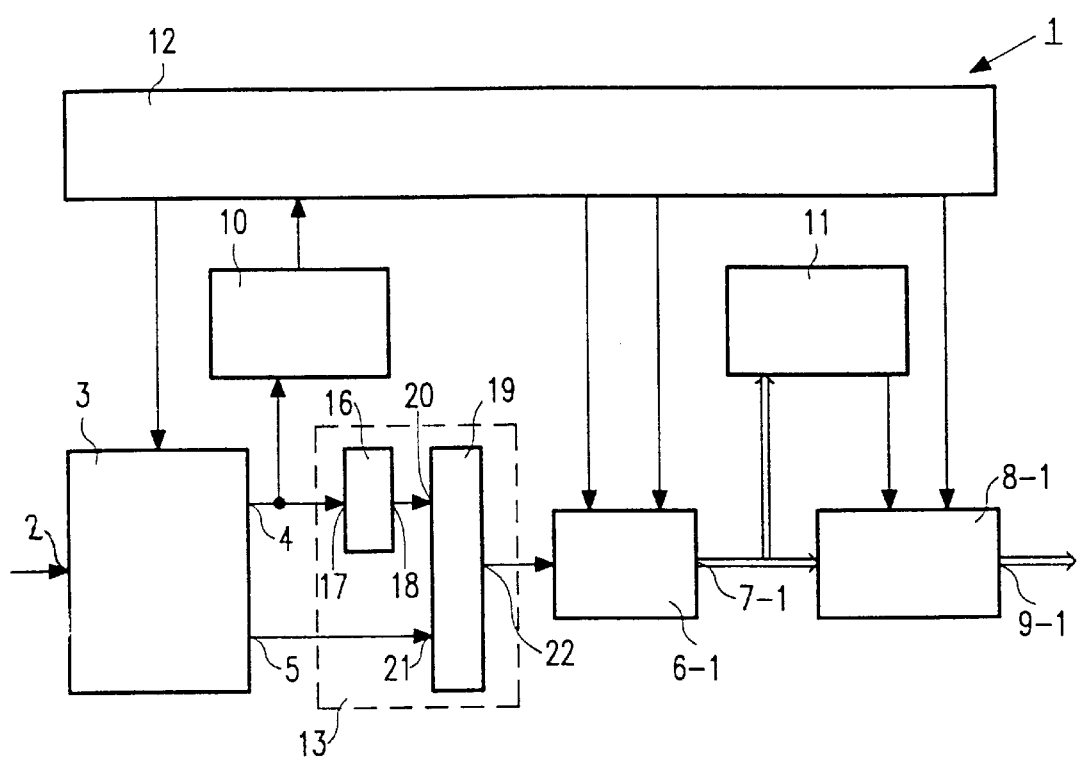

The FIGS. 1 to 3 respectively show three possible embodiments of the device according to the invention with reference to which also the method according to the invention will be further explained.

DESCRIPTION OF PREFERRED EMBODIMENTS

Each of the FIGS. 1 to 3 shows a relevant part of a possible embodiment of a device 1 which is preferably to be integrated with a semiconductor element arranged as an IC, which device forms part of an information processing or transmission system 1, through an input 2 of which device is sent information read from a medium such as a hard disk to a bit detector 3 of the device 1. This information is previously written on the hard disk by writing means not shown. The bit detector 3 further has a data output 4 and an erasure output 5 of which the operation is generally known and is briefly discussed above. The detector 3 may be of any type which mostly detects erasure information without needing any further measures. Examples of detection mechanisms providing erasure information can be found in the literature referred to above.

The device 1 further includes: serial/parallel converter means 6-1 connected to the data output 4, and decoding means formed by a modulation decoder 8-1 connected to an output 7-1 of the serial/parallel converter means 6-1, for producing data words in a manner known per se on an output 9-1. In addition, a word synchronization detector 10 and a frame synchronization detector 11 are connected to the data stream at 4 and 7-1 and possible at 9-1 in a manner not shown in the Figure, and a time base generator 12 is connected to the various parts mentioned above.

The operation of the device 1 described thus far is such that after the detector 3 has processed the information bit-by-bit timed by the time base generator 12, the information read at 2 is available on output 4 in digital form for word synchronization by detector 10 and serial/parallel conversion by converter 6-1. From the eight-by-wide parallel output signal on output 7-1 in this embodiment, the start of a user data frame is detected by a detector 11 and this user data is decoded by the modulation decoder 8-1 with the right timing of time base generator 12, after which the parallel data stream is available on output 9-1 to be further processed by, for example, scrambling means and error detecting and/or error correcting means (not shown in a Figure).

In the embodiments of FIGS. 1, 2 and 3, the device 1 comprises erasure processing means 13 shown in a dashed line. In FIG. 1 these processing means 13 are formed by series/parallel converter means 6-2 which are connected to erasure detecting means 8-2 which produce on output 9-2, simultaneously with the data on output 9-1, erasure information which is indicative of the influence of, for example, media defects on the data stream on output 9-1. During this activity an erasure is counted during the length of each individual bit, and thus briefly, so that simultaneously with the data, information is available about the correctness or not of the information read at these spots. For that matter, irrespective of the duration of the counting operation, the processing may be effected in such a way that an erasure or ambiguity in a bit is counted as a flag per bit. It is alternatively possible to count an erasure flag for an ambiguity that has occurred in a group of bits or bytes.

On the other hand, if the erasure information were counted for a longer period of time, a measure would result therefrom for the average quality of the information transmission via the medium and thus for the bit error rate. If such a counting operation is effected in the erasure processing means 13, the output 9-2 needs to be read out only relatively infrequently, and it is attractive to have such an operation take place in the serial interface which is not shown in the Figure, but is often already present in the IC. It is likewise possible to perform a short-term erasure counting in the erasure processing means 13, for example, codeword-by-codeword or bit-by-bit and then perform a long-term erasure counting based on the output signal of 9-2 by external counting means (not shown).

In the case of short-term erasure counting, the embodiment of FIG. 1 has the disadvantage that all the information on output 9-1 or part thereof is to be taken out by separate pins on the IC. Furthermore, relatively complex components such as the serial/parallel converter means 6 and the decoder 8 are practically to be doubled.

The embodiment of FIG. 2 does not have this drawback. The device 1 here has a multiplexer 14 as an erasure counting means, connected to the data output 4 and the erasure output 5, the output 15 of which multiplexer is connected to the sole serial/parallel converter means 6-1 and decoder means 8-1. At a particular instant, the multiplexer 14 switches either the data output 4, or the erasure output 5 to its output 15. Consequently, data and erasures are never available simultaneously. This embodiment does have the advantage that it needs only a few serial/parallel converter means 6-1 and decoder means 8-1 and, besides, does not need any additional external IC pins and is thus highly simplified compared with the embodiment of FIG. 1.

It may be attractive in this respect to modify the functionality of the decoder when erasures are processed, so that error propagation is avoided. For example, it is possible to give all the decoder output signals the logic "0" level when there are not unreliable decisions, and the logic "1" level when there are unreliable decisions.

In the embodiment shown in FIG. 3, the erasure processing means 13 comprise a bit delay unit 16 which has an input 17 connected to the data output 4, and an output, and comprising an exclusive-OR circuit 19 which has two inputs 20 and 21. Input 20 is connected to output 18 and input 21 is connected to erasure output 5, while the output 22 of the exclusive-OR circuit 19 is connected to the serial/parallel converter means 6-1. The delay unit 16 may be arranged so that it delays by one or more data bits. The moment an erasure is detected, the bit preceding the current data bit, with respect to which the erasure was still zero and which was thus probably correct, flips or commutates. The commutation of this preceding, correct bit, however, is detected and corrected by the afore-mentioned error detection and correction means and marks uniquely and, moreover, also during the periods when the medium is on the fly, the beginning of an area that may be considered a medium defect on the hard disk. This technique works for random data patterns, unlike the known test methods working without erasures. More particularly, when applied to decoders which show little error propagation, erasures can be located extremely accurately. In a most simple embodiment, a bit delay unit 16 is applied, which hardly requires any additional provisions further to the exclusive-OR circuit 19 which is simple to implement.

The procedure just described is only mentioned by way of example and is not restrictive as to the scope of the invention. For example, it is likewise possible to provide a predefined data signal having a regular structure, for example, an all-zero pattern instead of a random data signal. This pattern may be preprocessed, as required, in a scrambler (not shown) and then be written via a modulation coder. If a deviation from the original regular pattern is detected when read out, after modulation decoding and possible scrambling, this deviation is indicative of an erasure and may be assumed to indicate the presence of a media defect. In this manner media defects are easy to detect, without the need for implementing an error corrected code and without restrictions worth mentioning as regards the number of erasures that can be detected reliably.

In an alternative embodiment to the embodiment of FIG. 1, a serial/parallel converter could even be omitted to measure erasures directly at high speed.

What is claimed is:

1. A method by which information is written into a medium, is read out, and which establishes whether the information read is sufficiently reliable, the method comprising: generating erasure information indicative of unreliable decision, using the erasure information as a reliability indicator to detect the presence of media defects, generating location information about medium locations where media defects occur which are dependent on the detection of media defects, and storing said location information to mark said locations as unusable for writing and/or reading information.

2. A method as claimed in claim 1, which comprises counting the erasure information.

3. A method as claimed in claim 1, which comprises counting the erasure information during relatively short periods of time, which short erasure counting provides a measure to detect the location of media defects in the medium, and/or counting the erasure information during relatively long periods of time, which long erasure counting provides a measure for the bit error rate of information transmission by the medium.

4. A method as claimed in claim 3, wherein, if the erasure information is counted during relatively short periods of time, the counting (incrementing) instants are stored relative to a spot on the medium where the reading takes place at that instant, thereby to mark the spot where the medium defect starts.

5. A method as claimed in claim 1, characterized in that a bit error is deliberately introduced in the read data stream when an erasure is detected during the reading of digital information from the medium.

6. A method as claimed in claim 5, comprises introducing the bit error at a bit just preceding or following the bit at which an erasure is detected.

7. A method as claimed in claim 1 which comprises:
   counting the erasure information during relatively short periods of time so as to detect the location of media defects in the medium, and
   counting the erasure information during relatively long periods of time so as to determine the bit error rate of information transmission by the medium.

8. A method as claimed in claim 1 which comprises:
   counting the erasure information during relatively short periods of time so as to detect the location of media defects in the medium, and
   storing the counting instants relative to a spot on the medium where the reading takes place at that instant thereby to mark the spot where the medium defect starts.

9. A method as claimed in claim 1 wherein the medium is a disk and only media defects on the disk are detected, and said method comprises processing erasure information related only to the media defects on the disk so as to prevent use of said medium locations to store data.

10. A method as claimed in claim 1 which further comprises, based upon the stored location information, inhibiting the storage of data at locations on the medium where media defects were detected.

11. A device for writing information into and reading information out from a medium, comprising: read/write means with reliability indicator means, means coupling the read/write means to the medium, wherein the reliability indicator means comprise an erasure information generator means for generating erasure information indicative of unreliable decision, detection means for detecting the presence of media defects on the basis of said erasure information, means for generating location information about medium locations where media defects occur dependent on the detection of media defects, and means for storing said location information to mark said locations as unusable for writing and/or reading information.

12. A device as claimed in claim 11, which further comprises:
   a time base generator,
   the erasure information generator means being connected to the time base generator and comprising a bit detector having an erasure output and a data output,
   serial/parallel converter means coupled to the time base generator and to the data output of the bit detector,
   decoder means connected to the serial/parallel converter means and to the time base generator, and erasure processing means coupled to the erasure output of the bit detector and to the decoder means.

13. A device as claimed in claim 12, wherein the erasure information relates only to media defects and the erasure processing means comprise counting means.

14. A device as claimed in claim 12, wherein the erasure processing means comprise a multiplexer connected to the data and erasure outputs of the bit detector and to the serial/parallel converter means.

15. A device as claimed in claim 12, characterized in that the erasure processing means comprise a one-bit delay unit connected to the data output of the bit detector and having an output, and an exclusive-OR circuit having two inputs and an output, one of the inputs of the exclusive-OR circuit being connected to the output of the one-bit delay unit and the other input of the exclusive-OR circuit being connected to the erasure output of the bit detector, the output of the exclusive-OR circuit being connected to the serial/parallel converter means.

16. A device as claimed in claim 12, characterized in that the erasure processing means comprise second serial/parallel converter means connected to the erasure output of the bit detector and erasure decoder means connected to the serial/parallel converter means.

17. The device as claimed in 11 further comprising a time base generator, and wherein the erasure information generator means comprises;
   means controlled by the time base generator and coupled to said medium for separately deriving data information and erasure information at a data output and an erasure output, respectively,
   serial/parallel converter means controlled by the time base generator and coupled to the data output of said deriving means, and
   decoder means controlled by the time base generator and coupled to an output of the serial/parallel converter means, and
   erasure processing means coupled to the erasure output of the deriving means and to the decoder means.

18. The device as claimed in claim 17 wherein the erasure processing means comprise a multiplexer having input means coupled to the data output and to the erasure output of the deriving means and an output coupled to an input of the serial/parallel converter means.

19. A method for reliably reading information out of an information carrying medium, comprising:
   deriving erasure information from said medium, and
   using the erasure information as a reliability indicator to establish only the presence of media defects.

20. The method as claimed in 19 which further comprises:
   deriving data information from said medium, and
   decoding in separate time intervals the data information and the erasure information.

* * * * *